(12) United States Patent
Norris et al.

(10) Patent No.: US 7,799,144 B2
(45) Date of Patent: Sep. 21, 2010

(54) CLEANING FILTER COMPONENTS

(75) Inventors: Peter John Norris, Accrington (GB);
John Norris, Burnley (GB);
Christopher Reid, Blackburn (GB);
James Peter Millington, Northwich (GB)

(73) Assignee: Longworth Engineering Ltd., Blackburn, Lancashire (GB)

( * ) Notice: Subject to any disclaimer, the term of this patent is extended or adjusted under 35 U.S.C. 154(b) by 1020 days.

(21) Appl. No.: 10/558,611

(22) PCT Filed: May 28, 2004

(86) PCT No.: PCT/GB2004/002266

§ 371 (c)(1),
(2), (4) Date: Mar. 10, 2006

(87) PCT Pub. No.: WO2004/105918

PCT Pub. Date: Dec. 9, 2004

(65) Prior Publication Data

US 2007/0051390 A1    Mar. 8, 2007

(30) Foreign Application Priority Data

May 29, 2003   (GB)   ................... 0312281.9

(51) Int. Cl.
*B08B 9/00*      (2006.01)
*B08B 9/027*     (2006.01)

(52) U.S. Cl. ................ 134/22.1; 134/22.11; 134/22.12; 134/22.15; 134/22.18

(58) Field of Classification Search ........................ None
See application file for complete search history.

(56) References Cited

U.S. PATENT DOCUMENTS

| 3,426,091 | A | * | 2/1969 | Miron et al. ................. 585/440 |
| 4,238,428 | A | * | 12/1980 | Sasaki et al. ................. 264/13 |
| 4,424,080 | A |   | 1/1984 | Days |
| 4,540,467 | A |   | 9/1985 | Grube |
| 5,064,487 | A |   | 11/1991 | Fourne |
| 5,487,836 | A | * | 1/1996 | Mason et al. ................ 210/791 |
| 5,849,094 | A |   | 12/1998 | Mignani |

FOREIGN PATENT DOCUMENTS

| DE | 19813865 | 9/1999 |
| EP | 0791386 | 8/1997 |

* cited by examiner

*Primary Examiner*—Duy-Vu N Deo
(74) *Attorney, Agent, or Firm*—Woodard Emhardt Moriarty McNett & Henry (57) ABSTRACT

A method of cleaning a filter component comprises subjecting the component to an atmosphere of superheated steam at a pressure of a least 0.5 bar in a vessel and subsequently decompressing the vessel to achieve a pressure reduction of at least 0.5 bar in at most 5 seconds. The method is particularly useful for the cleaning of filter components that have been used for the filtration of molten polymer (e.g. polyester) and which are at least partially blocked by solidified polymer.

31 Claims, 2 Drawing Sheets

CLEANING FILTER COMPONENTS

The present invention relates to the cleaning of filter assemblies and parts thereof (hereinafter referred to collectively as "filter components" for convenience) contaminated with a residue deposit thereon which may, for example be blocking or partially blocking the filter component thus impairing performance. The component may, for example, be one that has been used in the filtration of molten polymers, e.g. polyesters, such that the deposited residue that needs to be removed is solidified polymer. Further examples of residues that may require removal are fillers and catalyst residues, which may for example be incorporated in a solidified polymer residue. The invention is particularly applicable to the cleaning of filter elements (i.e. the component which effects the actual filtering operation, e.g. to remove contaminant particulate material from a molten polymer).

The polymer industry may be cited as a user of filter elements that ultimately become blocked and require cleaning. In this respect, various processing operations as carried out in the polymer industry involve filtration of thermoplastic polymers (e.g. polyesters) in the liquid state. Clearly the filtration is carried out at relatively high temperatures to ensure that the polymer is maintained as a liquid. Even so the liquid is highly viscous and high pressure is required. Consequently the filter elements used are of high engineering quality, usually manufactured from stainless steel, are of sophisticated design and mechanically delicate. Typically the minimum pore size of the filter element ranges from less than 1 to 100 microns. The re-use of these filter elements is an important part of the economics of the process so that cleaning of the filter elements is required.

Generally a filter element to be cleaned will be encased in excess polymer because the filter element has not been drained after isolation from the polymer feed but simply left (part full of polymer) to cool. The polymer then freezes into a solid block.

Heating of a filter element contaminated with a thermoplastic polymer in an inert atmosphere to above the melting point of the polymer will generally allow much of the excess simply to be drained away. This process will not remove all of the polymer but will allow liquid or gas to be fed into the element. The key to good cleaning is the removal of polymer residues (e.g. in the form of thin film) that adhere to the microporous filter construction. This is generally effected using processes 1 or 2 below:

1. Heat treatment in a high boiling solvent, such as triethylene glycol. The high temperature softens and partially depolymerises the polymer. Subsequently the filter element is sprayed with high pressure water to remove the bulk of the contaminant polymer.
2. Injection of superheated steam into the filter element. This technique is used particularly for cleaning of filter elements contaminated with polyesters since low molecular weight oligomers and ultimately the parent acid and alcohol are produced by hydrolysis of the polymer.

At the termination of either these processes there remains residual material (between 0.5 and 1%) that is strongly adherent to, usually inaccessible parts of, the filter. This material may be removed by one or any combination of the following Steps 3 to 6.

3. The filter element may be heated in a reduced oxygen content atmosphere to achieve controlled pyrolysis. Some of the polymer material is oxidised and some reduced because elemental carbon is often found on the metal surfaces.
4. Oxidation may be used, in effect, to burn off any residual carbon. The technique usually involves heating the filter element in air to a temperature of approximately 360° to 440° C. This technique must be effected with some care as the combustion of any adsorbed carbon will at best result in the discoloration and at worst the destruction of part of the element.
5. Ultrasonic Cleaning is often used to remove small intractable pieces of polymer or degraded polymer as well as trapped fillers and other process contaminants and debris.
6. The filter may be subjected to a base (usually caustic soda) treatment to complete the cleaning process, and then an acid treatment to passivate the base and to restore a bright surface to the metal. This is frequently effected using a sodium hydroxide wash followed by phosphoric acid to restore a bright surface to the metal. The purpose of the alkaline wash (to degrease the surface and dissolve any residual fillers etc from the original polymer) followed by phosphate treatment is to remove any residual oxide film in order to give the piece a bright surface.

A further cleaning technique that has recently been developed is known as the HYPOX Process and is used particularly for the cleaning of filter elements contaminated with polyesters. Initially, the filter element is heated and hot nitrogen gas passed therethrough so as to "melt-out" polymer residues. Subsequently the filter element is treated with superheated steam to hydrolyse polyester residues. The next stage of the treatment involves controlled pyrolysis in a low oxygen-containing atmosphere and finally oxidation.

Although the emphasis in the above description has been laid on the cleaning of filter elements employed in the polymer processing industry, there are many other examples of filter elements that require cleaning for re-use, e.g. in the organic and pharmaceutical industries.

According to the present invention there is provided a method of cleaning a filter component comprising subjecting the component to an atmosphere of superheated steam at a pressure of at least 0.5 bar in a vessel and subsequently decompressing the vessel to achieve a pressure reduction of at least 0.5 bar in at most 5 seconds.

Superheated steam is steam which has a temperature and pressure above the well-known "Steam Saturation Curve", which is shown for example in "Thermodynamic Properties of Fluids and Other Data", Mayhew and Rogers, published by Oxford Basil Blackwell (1966).

The invention has been based on our finding that filter components may be cleaned effectively by subjecting the component (provided in a suitable vessel) to superheated steam (the vessel thus being at elevated pressure) and then effecting a flash decompression of the vessel. By the term "flash decompression" we mean that the pressure in the vessel is reduced by at least 0.5 bar in a period of 5 seconds or less. We have found that initial treatment of the filter component in an atmosphere of superheated steam followed by flash decompression is effective to remove even small amounts of residue that adhere to the filter component in the heart thereof. Whilst the invention is not limited to any particularly theory, we believe that the method is effective because the superheated steam is initially able to 'penetrate' the polymer interstices and between the residues and components of the filter component to which they adhere. Subsequently the flash decompression results in instantaneous boiling of water in the interface between the residues and the filter components (and possibly also within the residues themselves) resulting in the residues being shattered and stripped from the filter component. The invention is not however limited to this theory since alternative and/or additional mechanisms may operate, e.g. depending on circumstances.

The treatment of the invention is relatively easy to carry out and is effective for removing amounts of residues that would be difficult if not impossible to remove by other conventional techniques. Indeed the present invention can be effective for cleaning filter components which would otherwise simply be rejected and scrapped.

The pressure reduction achieved during flash decompression (in less than five seconds) may be at least 1 bar, for example at least two bar. As indicated, the flash decompression is effected in a maximum of five seconds. More preferably, the flash decompression is achieved in at most four seconds, more preferably at most three seconds, even more preferably at most two seconds and most preferably in a time period of one second or less. Generally the time for flash decompression will be a minimum of one millisecond. Thus, for example, a period of one millisecond to five seconds maybe appropriate.

Generally the treatment of the invention will involve subjecting the filter component to an atmosphere of 1 to 15 bar (or even higher) of superheated steam. The treatment may be effected by increasing the pressure of the superheated steam in the vessel to a predetermined value (e.g. in the range of 2 to 15 bar) and once the predetermined value has been reached effecting flash decompression of the vessel. The pressure may be raised to the desired value over any suitable period, eg 1 to 10 hours. Alternatively the filter component may be subjected to superheated steam at a particular pressure for a certain length of time prior to flash decompression being effected. Once again, the pressure may be increased to the desired value over a period of 1 to 10 hours and then maintained at that value for a further period of 1 to 10 hours.

The method of the invention may involve repeated steps of subjecting the component to superheated steam and then effecting flash decompression. In one embodiment of the invention, flash decompression is effected when the vessel is at the desired pressure and then flash decompression is repeated as soon (or shortly after) the vessel has returned to the desired pressure. This procedure of effecting flash decompression as soon as (or shortly after) the vessel has returned to pressure may be effected several times, subsequent to which the vessel may be allowed to remain at the desired pressure for a relatively prolonged period of time, subsequent to which there may be one or more steps of flash decompression as described.

The method of the invention may thus comprise at least two cycles of subjecting the component to the atmosphere of superheated steam at a pressure of at least 0.5 bar in a vessel and subsequently decompressing the vessel to achieve a pressure reduction of at least 0.5 bar in at most 5 seconds. In an advantageous embodiment of the invention, the superheated steam is allowed to flow through the vessel between said cycles, and preferably also through the filter component.

A further embodiment of the invention comprises at least one set of repeated cycles of subjecting the component to the atmosphere of superheated steam at a pressure of at least 0.5 bar in the vessel and subsequently decompressing the vessel to achieve the pressure reduction of at least 0.5 bar in at most 5 seconds. The cycles of a set may be effected substantially immediately one after the another. The method may comprise at least two of said sets of cycles between which superheated steam is allowed to flow through the vessel, and preferably also through the filter component.

For the purposes of effecting flash decompression, the vessel in which the filter element is treated will be provided with a suitable valve (the "flash decompression valve") which may be rapidly opened to allow release (from the vessel) of the superheated steam to effect flash decompression. The flash decompression valve may for example be a butterfly valve or similar rapid opening low flow restriction valve.

In order to achieve best results using the method of the invention in the case where the filter component is a filter element, it is preferred that the superheated steam is allowed to flow through the filter element during at least part of the time for which it is being treated with the superheated steam. This may be achieved by feeding superheated steam to one side of the filter element such that the steam has to pass through the element to reach the outlet of the vessel, the superheated steam being bled from the vessel so as to create a flow of the steam through the filter element, eg at a rate of 10-100 kg/hr. The steam may be bled from the vessel either via a partly open valve which is subsequently further opened to effect flash decompression or through a separate bleed valve provided on the vessel. Preferably the flow of steam through the filter element is countercurrent to the direction in which liquid (e.g. molten polymer) was passed through the filter element during its filtering duty. Thus, for example, if the filter element is tubular and its filtering duty involved flow radially inwardly through the filter then preferably the superheated steam is arranged to flow radially outwardly.

The superheated steam supplied to the vessel will generally be at a temperature of (150° C. to 400° C.)

In a refinement of the invention, the vessel is initially supplied with dry saturated clean steam which will be at a temperature of 100-150° C. to serve to heat the component somewhat before the introduction of the superheated steam. Dry saturated steam is steam that has absorbed the maximum amount of enthalpy of evaporation and is 100% dry, i.e. no free moisture.

An apparatus for effecting the process of the invention may comprise, in addition to the flash decompression valve, an outlet flow control valve which may be adjusted to provide a desired steam flow through the vessel. The outlet valve may, for example, be a needle valve.

Taking into account the above points, a preferred process in accordance with the invention comprises the followings steps.

(a) initial introduction of dry saturated clean steam, ( the desired temperature being achieved by controlling the steam outlet flow by means of a fine control valve.

(b) introduce dry superheated clean steam at e.g. 400° C. into the vessel and maintain the outlet flow control valve open. This step is effected so that the temperature in the vessel is brought to a desired level.

(c) close the outlet flow control valve to allow the pressure in the vessel to increase to a predetermined value, e.g. 3 bar.

(d) effect flash decompression as soon as (or shortly after) the desired pressure in the vessel (e.g. 3 bar) has been achieved by opening of the flash decompression valve.

(e) close the flash decompression valve.

(f) effect at least one further cycle of steps (d)-(e).

(g) open the outlet flow control valve and subject the component to a further period of treatment with the superheated steam.

(h) repeat steps (c)-(g) as often as required.

(i) close the outlet flow control valve to allow the pressure in the vessel to increase to a predetermined value, e.g. 3 bar.

(j) effect final flash decompression and allow vessel to cool.

A particularly preferred embodiment of the invention relates to the cleaning of filters which (when located in the vessel) may be considered to have an "upstream" side and a "downstream" side, the latter being on the outlet side of the vessel. For the purposes of Step (a) above, the dry saturated clean steam is initially applied to the "downstream" side of the filter. For the purposes of Step (b), the superheated steam may initially be applied to the "downstream" side of the filter (particularly if polymer melting is required—see infra) and is then applied to the "upstream" side of the filter so as to pass therethrough. The pressure in the vessel may then be increased to the required value (Step (c)) and then the flash decompression procedure effected in accordance with Steps (d)-(j) as outlined above.

The flash decompression may be effected by opening the flash decompression valve and venting the superheated steam directly to atmosphere. It will however generally be more preferred to transfer the steam from the vessel in which the filter component is treated into a so-called 'blowdown' vessel from which the steam is either discharged to atmosphere or passed to a fume treatment step.

Steam to be used in the method of the invention should be relatively clean and ideally will have a maximum of 100 ppm impurities (e.g. metal ions). Any conventional means may be used for generating and providing the superheated steam to the vessel.

Filter components that may be cleaned in accordance with the invention include, but are not limited to, filter elements such as fine those of metal, fibre, powder, wire or ceramic construction. Whilst the method of the invention is effective for cleaning a filter element (a filter) as an item in its own right, the method may also be used for cleaning objects that incorporate filter elements, e.g. candle filters, disk filters and spinnerettes. The invention is also applicable to the cleaning of a filter assembly comprised of a plurality of filter elements. Further examples of filter components that may be cleaned in accordance with the invention include housings, feed pipes, head stocks, pumps, extruder screws, valves, dies, spinnerettes etc.

The invention is particularly useful for the cleaning of filter components (e.g. filter elements) which have been used for the filtration of molten polymers (e.g. thermoplastics), which may for example incorporate fillers such as barium sulphate or titanium dioxide. The polymer may be one that has hydrolysable linkages along its backbone since hydrolysis of such linkages by the superheated steam will contribute to the overall cleaning process. The invention is therefore particularly applicable to the cleaning of filter components that have been used for the processing of molten condensation polymers, e.g. polyesters, polyamides (e.g. nylons and similar materials), cellulose acetate and polycarbonates. Thus for example filters that have been used in the processing of molten PET (polyethylene terephthalate) can beneficially be cleaned in accordance with the invention.

When cleaning filter components that are contaminated with solidified polymer, it is preferred that the superheated steam raises the temperature of the component to the melting point of the polymer before any flash decompression step is effected. In a particular preferred embodiment, the temperature of the filter component is raised to the melting point of the polymer and the pressure in the vessel is then further increased before flash decompression is effected. Therefore applied to the sequence of steps (a)-(j) given above for effecting a preferred embodiment of the invention then step (b) is effected to bring the component to the melting temperature of the polymer. In a particularly preferred embodiment of the invention as applied to cleaning of a filter, the superheated steam may initially be applied to one side of the filter to effect a degree of melting of the polymer and "open" passageways through which superheated steam may flow. Subsequently the superheated steam may be applied to the opposite side of the filter for the purposes of increasing the pressure in the vessel prior to effecting flash decompression.

Thus in a preferred process for cleaning a filter contaminated with solidified polymer, the filter (provided in the vessel) is initially treated on one side with dry saturated steam to effect a temperature increase and is then further treated on that side with superheated steam to effect melting of the polymer to "open" passageways through the filter. Subsequently the superheated steam is supplied to the other side of the filter and allowed to flow through the filter. The procedure is continued until the desired pressure level in the vessel has been achieved and flash decompression may be effected, as described more fully above.

In a further preferred embodiment of the invention as applied to the cleaning of filter components contaminated with polymer, the vessel has a lowermost steam outlet (through which steam flows during the process and during flash decompression (i.e. steps (b) and (d) above) and the outlet is covered by a conical mesh filter (apex uppermost) which traps particles of solidified polymer that have been dislodged from the filter component. We have found that at the end of the cleaning process the polymer particles which were initially collected against the conical mesh or in fact broken down by the flow of steam that occurs so that the solid residue of the process is somewhat less than the amount of polymer actually dislodged from the filter component.

It is possible for the component to be subjected to an initial hydrolysis step with the steam before the pressure in the vessel is increased for the flash decompression step.

Whilst the present invention is very effective for removing substantial amounts of contaminant residues from filter components, it may in some instances also be appropriate to effect a final step of ultrasonic cleaning (using standard techniques) for final removal of residues.

Filter components contaminated with polymers other than those having hydrolysable linkages along the backbone may however be cleaned using the techniques of the invention. Thus, for example, the invention may be used to clean deposits of olefin polymers or co-polymers, e.g. polyethylene, polypropylene or PTFE. Further examples of polymers that may be removed include polyurethane, PVA, PVC, polystyrene, PEEK, rubber or silicone.

Most preferably any bulk contaminant polymer on the filter component is removed prior to the treatment with superheated steam. In the case where the polymer is a thermoplastic, this may be achieved by conventional techniques involving heating of the polymer and allowing as much excess as possible to drain from the filter component.

It should be appreciated that polymer to be removed from a filter component may incorporate other contaminants, e.g. catalyst residues, additives and/or fillers etc. The method of the invention serves also to remove such contaminants from the filter components as well as the polymer itself.

Use of the invention also extends to the cleaning of the filter components that have been used in applications other than filtration of molten polymers. Thus the invention is also applicable to the removal of other organic contaminants such as may be present on filter components as employed for filtration in the Organic and Pharmaceutical industries. Equally the method is applicable for the removal of biological contaminants from filter components.

The invention will be illustrated by reference to the accompanying drawings, in which.

Figure 1:
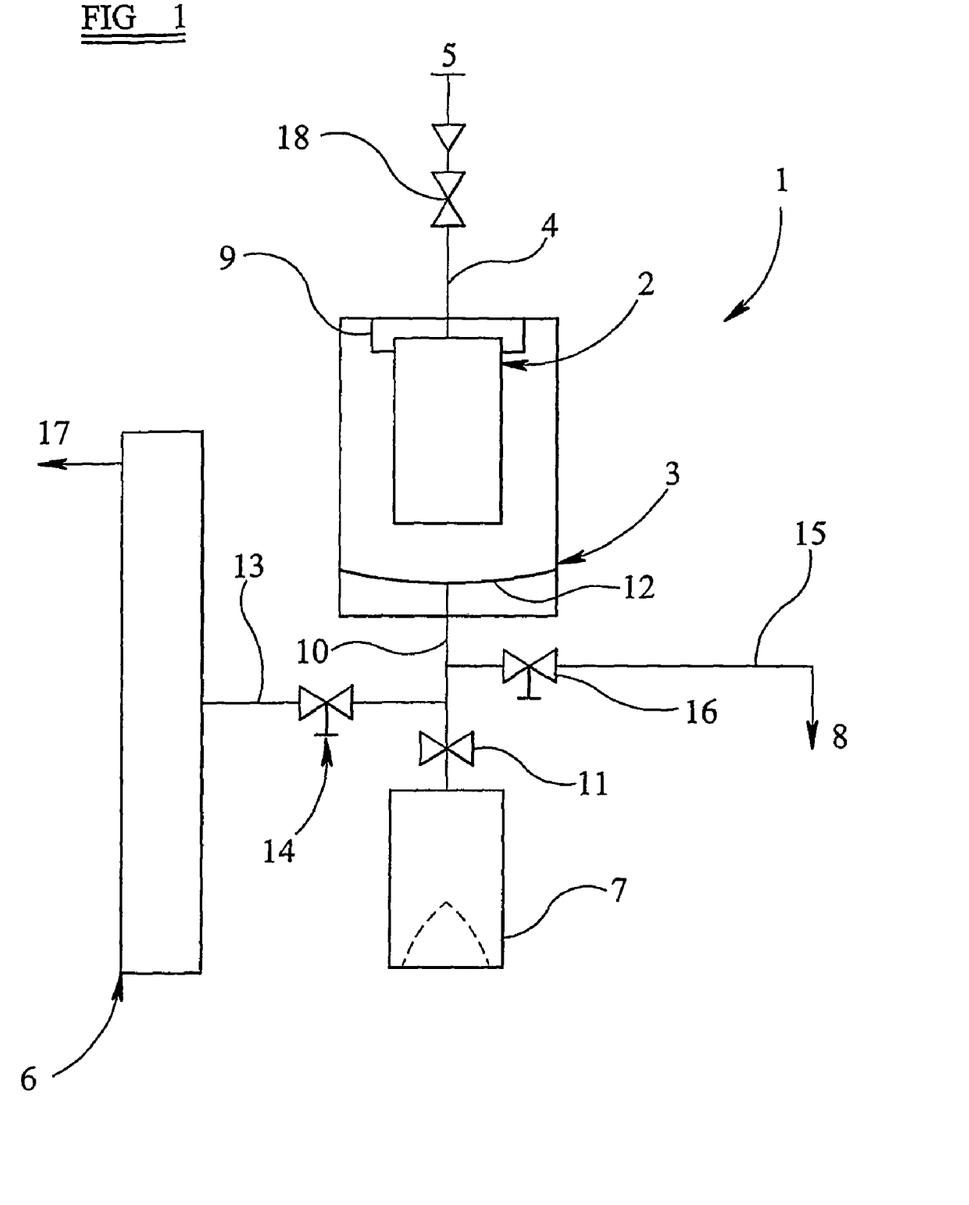
FIG. 1 is a schematic view of an embodiment of apparatus for carrying out the method of the invention.

The apparatus 1 illustrated in FIG. 1 is for cleaning a tubular filter element 2 and comprises a pressure vessel 3 having an inlet side connected by a line 4 to a supply 5 of superheated steam and an outlet side connected (in the manner described below) to a blowdown vessel 6, a receptacle 7 and a condensate treatment stage 8.

The illustrated filter element 2 may be one that has been used for filtration of molten polyethylene terephthalate. The filter element 2 is depicted as tubular and for the purposes of the present description it is assumed that (during its filtration duty) the molten polymer flowed radially inwardly through the filter.

Line 4, which as indicated above is connected via a valve 18 to a supply 5 of superheated steam, terminates (within the filter element 2) with a steam distributor (e.g. a spray head, not shown). A barrier arrangement 9 is provided to isolate the interior of filter element 2 from the main interior volume vessel 3.

On its outlet side, the vessel 3 has a line 10, connected via a shut off valve 11, leading directly to the receptacle 7 which serves to collect polymer removed from the filter element 2. To facilitate this collection, a dished collector 12 is provided within vessel 3 and feeds collected polymer into the line 10.

Line 10 has first and second branches 13 and 15 respectively. The first branch 13 connects the pressure vessel 3 to the blowdown vessel 6 via a fast acting valve 14 provided in the branch 13. The second branch 15 connects the interior of pressure vessel 3 to the condensate treatment stage via a bleed valve 16.

The fast acting valve 13 is such that it may be fully opened in a period of 1 millisecond to 1 second and also such that (when fully opened) the pressure vessel 3 may be flash decompressed to achieve a pressure reduction of at least 0.5 bar within one second. Valve 16 is such that (when open with valve 14 being closed) steam may bleed from the pressure vessel 3 at a rate of 10 to 100 kg/hr.

The outlet side of blowdown vessel 6 is connected to a fume treatment stage, as depicted by reference numeral 17.

Operation of the illustrated apparatus will now be described.

For the purposes of the following description, it is assumed that bulk thermoplastic polymer has previously been removed by melting from the filter element 2.

The cleaning of the filter element is effected in two stages. The first stage is a degradation step and the second stage employs flash decompression in accordance with the invention.

Initially, valve 14 is maintained closed but valves 11 and 16 are open.

Superheated steam is now supplied along inlet line 4 and permeates through the filter 2. This steam is able to effect melting of some of the polymer retained on the filter element resulting in the production of a degraded product that falls into the collector 12 and then passes to the receptacle 7. Any condensate formed during this stage of the treatment is passed via valve 16 to the condensate treatment stage 8 for the purposes of meeting effluent discharge requirements.

Valve 16 is now closed to allow the pressure in vessel 3 to increase.

Once the desired pressure in vessel 3 has been achieved (e.g. in the range 2 to 15 bar) and polymer melting is complete, the valve 18 connecting pipe 4 to the steam generator is closed and the fast acting valve 14 is opened. As a result, there is a flash decompression of the pressure in vessel 3, with the steam from vessel 3 being vented to the blowdown vessel 6 from which it then passes to the fume treatment step 17.

The process as described is effective for removing significant amounts of material which initially strongly adhered to the filter element and which would be difficult (if not impossible) to remove by other cleaning techniques. As indicated above, it is believed that the process is effective because water that has penetrated between the residues and the filter element on which they are adhered instantaneously boils upon flash decompression of the vessel 2 causing the contaminant to be released.

In a preferred method of operating the illustrated apparatus, valve 14 is closed immediately after the flash decompression and the valve 18 opened, allowing the pressure in vessel 13 to increase again to the required level. Valve 18 is then closed and valve 14 is opened again to effect a further flash decompression. This cycle of closing and opening valves 14 and 18 (with valve 16 closed) may be repeated several times in quick succession. Valve 14 may then be closed and valves 16 and 18 opened to allow superheated steam to "wash" the filter component. Subsequently further cycles of flash decompression may be effected by closing valve 16, allowing the pressure in vessel 3 to increase to a desired level, closing the valve 18 and then opening valve 14, all as described previously.

Figure 2:
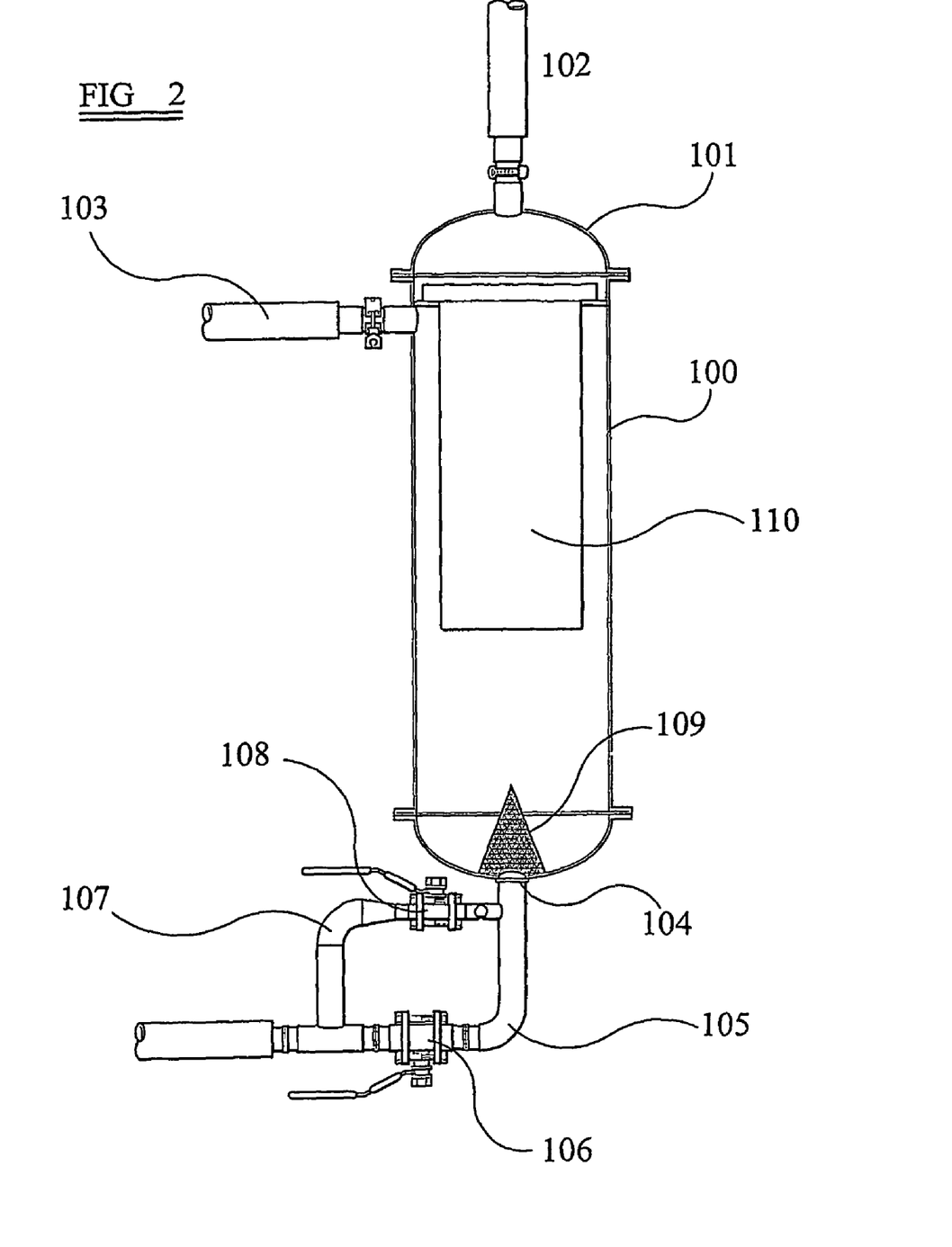
FIG. 2 is a schematic view of a further embodiment of apparatus for carrying out the method of the invention.

The apparatus 100 illustrated in FIG. 2 comprises a pressure vessel 101 having upper steam inlet pipes 102 and 103 connected via respective valves to a supply of superheated steam. The apparatus may be used for cleaning a contaminated cylindrical filter element 110 which is suspended on support below the upper rim of the vessel 100. Inlet 103 served to supply steam around the outside of the filter element and is used for initial heat treatment and polymer melting. Inlet 102 is aligned with (what during a filtration operation is) the outlet of the filter element 110. A lower steam outlet 104 is provided in the base of the vessel. The outlet 104 communicates with an outlet pipe 105 in which it is provided a valve 106 for effecting flash decompression of the vessel. A branch pipe 107 leads from a position upstream of valve 106 to downstream thereof and incorporates an outlet flow valve 108.

Provided over the outlet 104 is a conical mesh filter 109 disposed with its apex uppermost.

In operation of the apparatus 100 illustrated in FIG. 2, the filter component 110 to be cleaned is located in vessel 101 and dry saturated clean steam is initially supplied through inlet 103. During this time inlet pipe 102 is closed, flash decompression valve 106 is closed and outlet flow control valve 108 is open. Inlet 103 is used for initial heat treatment and polymer melting (without any steam being fed into inlet pipe 102). When the majority of the polymer has been removed, the steam flow in to pipe 103 is stopped and the steam supply switched to pipe 102. Outlet flow control valve 108 remains open.

It will be appreciated that the steam flow is now radially outwardly of the filter (since pipe 102 is aligned with the filter outlet) and is thus in the opposite direction to the polymer flow during filtration. The superheated steam supplied through pipe inlet 102 may for example have a temperature of about 400° C.

Assuming that the filter component is contaminated with polyester, the supply of superheated steam is continued to raise the temperature in vessel 101, to 200° C. to 300° C.

Outlet flow control 108 is now closed and the pressure in the vessel allowed to increase to, say, 3 bar.

Valve 106 is now opened to allow flash decompression. The valve 106 may now be closed and the pressure again allowed to rise to, say, 3 bar at which point valve 106 is opened to effect a further step of flash decompression. This cycle of raising the pressure to a desired value and then effecting flash decompression more-or-less immediately may be repeated at least one more time.

Then with valve 106 closed, the valve 108 is again opened to allow the component to be subjected to a flow of superheated steam for a desired period, e.g. 1-2 hours before further steps of flash decompression are effected During this step the pressure in the vessel may be 1.5-2.0 bar.

Finally, the superheater is switched off and the dry saturated clean steam is used as a coolant to reduce the temperature from say 400° C. to 250° C. All steam flow is then stopped and the component allowed to stand until it is safe to be handled. pressure in the vessel is released and the vessel is allowed to cool to allow the component to be removed The invention will be further illustrated with reference to the following non-limiting Examples which were carried out using an apparatus as illustrated in FIG. 1 of the drawings.

EXAMPLE 1

A stack of approximately 30, 17.5 cm (7 inch) filter discs and mandrel assembly, containing 7 Kg of solid polymer contaminant (a PET isophthalic acid copolymer resin filled with barium sulphate) was placed in a pressure vessel. The clean weight of this type of filter assembly (i.e. without any contaminant material) was 27.5 Kg.

The steam feed pipe was fitted into the pressure vessel 3 such that the steam flow was generally in the opposite direction to the flow of polymer during normal operation. The external feed pipe was connected to the steam super heater and the super heater started after flow was confirmed. The pressure and temperature were monitored at points before ($T_1$ and $P_1$) and after ($T_2$ and $P_2$) the component in the process. The following conditions were employed.

| Time (min) | $T_1$(° C.) | $T_2$(° C.) | $P_1$(bar) | $P_2$(bar) |
| --- | --- | --- | --- | --- |
| 0 | 371 | 266 | 1.1 | 1.1 |
| 30 | 381 | 294 | 1.8 | 1.7 |
| 60 | 379 | 292 | 1.8 | 1.8 |
| 90 | 391 | 302 | 2 | 2 |

When the pressure in the vessel 3 had reached 2.0 bar (90 minutes), the valve 14 was opened so that there was a pressure reduction in the vessel 3 of more than 1 bar in less than 1 second. The pressure was evacuated into the blow down vessel 6.

When the filter had cooled, it was removed and examined. The large majority of the contaminant had melted and was found to be in the base of the drain vessel 7 in a solid pyramid shape where it had fallen from the component to the bottom of the vessel. The weight of this material was approximately 4 Kg. There were also traces of contaminant all around the inner surfaces of the drain vessel. The filter assembly was again weighed and found to have lost a total of 5.5 Kg during the process.

The pyramid in the base of the drain vessel was formed from material that was friable and easily broken down to a fine powder; it retained none of the polymers original strength or hardness and had clearly been hydrolysed to small molecular fragments. At the points where the filter elements could be observed there was no polymer adhering to the metal.

EXAMPLE 2

The component type and dimensions and the procedure of this experiment are the same as those laid out in Example I above (same type contaminant as for Example 1). In this instance the assembly weighed 36.5 Kg before process. The stack again had a fully clean weight of 27.5 Kg. Therefore, the disc filter stack contained 9 Kg of solid polymer contaminant. The process was conducted under the following conditions.

| Time (min) | $T_1$(° C.) | $T_2$(° C.) | $P_1$(bar) | $P_2$(bar) |
| --- | --- | --- | --- | --- |
| 0 | 284 | 385 | 0.7 | 0.7 |
| 30 | 277 | 378 | 0.7 | 0.7 |
| 60 | 278 | 377 | 0.7 | 0.7 |
| 90 | 271 | 370 | 0.7 | 0.7 |
| 120 | 269 | 367 | 0.7 | 0.7 |
| 150 | 270 | 367 | 0.8 | 0.7 |
| 180 | 264 | 360 | 0.7 | 0.6 |
| 210 | 251 | 343 | 0.6 | 0.5 |
| 240 | 240 | 383 | 0.5 | 0.5 |

After 240 minutes, the valve was opened so that the vessel underwent a pressure reduction of 0.5 bar in less than 1 second.

The filter assembly was found to weigh 28.5 Kg, meaning the process had removed 8 Kg of polymer contaminant from the component. This represents a significant improvement over the results of experiment 1. Around 88% of the contaminant was removed in this instance compared with 78% in experiment 1.

EXAMPLE 3

A filter stack of 6 candle type filters, arranged in a hexagonal pattern and screwed into a head plate, was placed in the pressure vessel. The assembly of these filters was around 60 cm (24 inches) in length and 15 cm (6 inches) in diameter. The total clean weight was 21 Kg.

In this case, the unclean assembly weighed 33.5 Kg and therefore contained 12.5 Kg of solid polymer contaminant (a PET isophthalic acid copolymer resin filled with titanium dioxide).

The assembly was placed in the pressure vessel and the steam flow directed into the hollow centre of each cylindrical filter using a spray head with six individual openings. The conditions were as follows:

| Time (min) | $T_1$(° C.) | $T_2$(° C.) | $P_1$(bar) | $P_2$(bar) |
| --- | --- | --- | --- | --- |
| 0 | 391 | 395 | 1.5 | 1.4 |
| 30 | 391 | 296 | 1.6 | 1.5 |
| 60 | 391 | 295 | 1.5 | 1.4 |
| 90 | 391 | 296 | 1.7 | 1.5 |
| 120 | 385 | 292 | 1.9 | 1.8 |
| 150 | 382 | 290 | 2.2 | 2.1 |

After 150 minutes, the vessel was evacuated as described above.

The component was allowed to cool then removed and weighed. The component now weighed 24.5 Kg, meaning the process had removed 9 Kg of contaminant. This represents 72% of the total contaminant by mass.

EXAMPLE 4

In this case the component processed was an individual filter element taken from an assembly of over 50 identical elements. The element along with the rest of the assembly had been cleaned several times using current technologies and due to high mass test results had been rejected and sent for scrap.

Filter elements such as these are only rejected in this way when it is deemed uneconomic or even impossible to remove further contaminant. There is usually only negligible amounts of polymer left in the media at this stage as the element has undergone a solvent cleaning process since the last on-line run. The vast majority of excess weight is attributable to fillers and debris accumulated over hundreds of on-line hours.

This element was around 190 cm (5 feet) in length and 5 cm (2 inches) in diameter.

Before the process, the element was accurately weighed to 3.893 Kg. The process was conducted under the following conditions:

| Time (min) | $T_1(°C.)$ | $T_2(°C.)$ | $P_1(bar)$ | $P_2(bar)$ |
|---|---|---|---|---|
| 30 | 388 | n/a | 2 | n/a |
| 60 | 393 | n/a | 2.4 | 2.2 |
| 90 | 394 | n/a | 2.8 | 2.5 |
| 120 | 394 | n/a | 3 | 2.9 |
| 150 | 394 | n/a | 3 | 3 |
| 180 | 394 | n/a | 3 | 3 |

Following a full process cycle of hydrolysis and decompression the element was found to weigh 3.726 Kg. The process had removed 0.167 Kg from the element. This figure means that the element is now within an acceptable range from the benchmark weight and could be returned to production as part of a full assembly. Therefore this process has extended the life of this filter after it was considered uneconomic or even impossible to do this using current technologies.

EXAMPLE 5

The apparatus of FIG. 1 was used to clean a 60 cm (24 inch) long filter stack containing a total of around fifty, 17.5 cm (7 inch) diameter discs interspersed with feeder spacers which was contaminated with polyethylene terephthalate.

The apparatus was associated with a boiler capable to supplying dry saturated steam. The steam supply arrangement also included a superheater. The boiler was set to produce a steam pressure of 4 Bar (above atmosphere pressure). The input to the process vessel was restricted to 3.0 Bar (above atmospheric pressure).

Prior to the cleaning operation, the stack weighed 74.0 kg.

The stack was placed on a supporting bracket located in the top of the vessel 3 which was then sealed. Valve 14 was closed, valve 11 was opened fully and valve 16 opened partially. The steam supply was then connected to pipe 4.

When the steam flow was confirmed by pressure readings and sufficient steam had passed through the vessel to displace all of the air the super-heater was switched on and set to 430° C. The steam flow was adjusted by valve 16 to give the required flow When the vessel temperature reached 241° C., valve 16 was closed and the pressure in the vessel allowed to build up to 2.8 bar (above atmospheric pressure). When the vessel had reached this pressure, the valve 18 connecting the steam supply to pipe 4 was closed. Exit valve 14 (i.e. the flash decompression valve) was then opened for approximately 4 seconds so that the pressure in the vessel was rapidly reduced to the level of that in the outlet line (effectively atmospheric pressure). The pressure in the vessel was then again allowed to increase by immediately closing valve 14 and opening the valve 18 (valve 16 being maintained closed). When the temperature and pressure in the vessel had reached the previous values (241° C. and 2.8 bar respectively) and the readings had stabilised (after about 30 seconds) the valve 18 was closed and valve 14 opened as before for four seconds so that once again the pressure in the vessel was rapidly reduced (effectively to atmospheric pressure). This cycle of increasing the pressure in the vessel and effecting rapid decompression was repeated a further four times (i.e. a total of six cycles), taking a total time of about three minutes.

Valve 14 was then closed and valve 16 again opened partially. Further cycles of decompressions were carried out after 1 hour, 4 hours, 6 hours, 7 hours and 9 hours. In each case several decompressions were carried out (usually between four and six).

In any one decompression cycle, the several decompressions were carried out in quick succession as it is believed that the procedure served to soften and destroy the polymer at the polymer/steam interface and gradually exposed previously "underlying" polymer to the same effects of the process.

In the periods between the sets of decompression cycles, the stack was "washed" with steam under the same conditions as initially. This was done by closing valve 14 immediately following the final decompression of the cycle. The valve 18 connecting the steam supply to valve 4 was opened and the flow adjusted by controlling the steam flow by means of valve 16.

Following the final decompression, the superheater was switched off and the component cooled by passing clean (non superheated) steam through the vessel until the temperature fell below 120° C. At this point the steam flow was discontinued and the component and the equipment allowed to cool to ambient temperature. The base of the pressure vessel 3 and the collection vessel 7 was found to contain polymer fragments. The polymer fragments lying in vessel 7 were broken down to a fine, easily handled and benign powder.

The cooled stack was found to weigh 70 kg, indicating that a total of 4.0 kg of polymer had been removed.

On examination of the stack, it was seen that there was a thin coating of polymer on some of the filter disks. The stack was dismantled into individual filter discs and they were further processed through ultrasonic tanks and spray washing.

The discs were then tested for bubble point pressure and weighed individually. The results for all of the discs were found to be close to the original values. In practice each disc when new has bubble point pressure and mass measured. These are known as benchmark values and within certain tolerances, must be achieved on each subsequent cleaning. In this case the values for all the discs were within the tolerances for the benchmark values, and hence the stack was re-built and returned to the customer demonstrating that the component could be cleaned without the use of high boiling solvents.

EXAMPLE 6

The apparatus of FIG. 2 was used to clean a 30 cm (12 inch) long filter stack containing fifty, 17.5 cm (7 inch) diameter discs which was contaminated with polyethylene terephthalate.

The apparatus incorporated a steam supply system as described for Example 5. The boiler was set to produce a steam pressure of 4 Bar (above atmospheric pressure). The input to the process vessel was restricted to 2.5 Bar (above atmospheric pressure).

The cone 109 fitted into the base of the vessel is designed to prevent large polymer fragments being carried into the lower valve and pipe work system (106, 108, 105 and 107) and to improve the breakdown of the polymer. It performs the same function as process vessel 7 in FIG. 1. The cone was constructed from stainless steel perforated with regular pores of 400-micron diameter.

The filter component to be cleaned initially weighed 34.0 kg. It was placed on a supporting bracket located in the top of the vessel. The vessel was then sealed. Valve 106 and the valve connecting pipe 102 to the steam supply were closed. The steam supply was then connected to pipe 103 and valve 108 adjusted to give the required flow around the component. When the steam flow was confirmed by pressure readings and sufficient steam had passed through the vessel to displace most of the air the super-heater was switched on and set to 400° C. Valve 108 was used to adjust the flow in the vessel to the required value. The steam was allowed to flow around the stack until most of the polymer adhering to the outside of the stack had been melted and degraded. The valve feeding steam to pipe 103 was then closed and that feeding pipe 102 opened, resulting in steam being directed from pipe 102 into the inside of the filter component.

When the vessel temperature reached 215° C. the first decompression cycle was carried out. This was done by closing valve 108 and allowing the pressure to build up to 2.0 bar (above atmospheric pressure), the valve connecting pipe 102 to the steam supply was then closed and exit valve 106 (i.e. the flash decompression valve) opened for approximately four seconds, allowing the pressure in the vessel to reach the level of the outlet line (effectively atmospheric pressure). The pressure in the vessel was again allowed to rise by immediately closing valve 106 and opening the valve connecting the steam supply to pipe 102, valve 108 remaining closed. When the temperature and pressure in the vessel had reached the previous values (215° C. and 2.0 bar) the valve connecting pipe 102 to the steam supply was closed and as before valve 106 was opened for approximately four seconds. Further cycles were carried in quick succession to give a total of six such cycles over a period of two to five minutes. Further multiple decompressions were carried out at approximately hourly intervals over a period of five hours. Each multiple decompression comprised four to six decompressions at each decompression stage.

In the periods between the sets of decompression cycles, the stack was "washed" with steam under the same conditions as initially. This was done by closing valve 106 immediately following the final decompression of the series. The valve connecting the steam supply to pipe 102 was then opened and the flow controlled by adjusting valve 108.

On completion of the treatment, the vessel and stack were cooled as described in Example 5 above.

Following treatment the stack was found to weigh 29.5 kg indicating the removal of 4.5 kg of polymer.

When the component was tested all the discs were within the benchmark values and required no further cleaning.

In this case the trial showed that the solvent cleaning step could be avoided but also the subsequent tanking and manual washing stages. This would represent a significant cost and time reduction if the results could be repeated.

Following the trial, an inspection of the pressure vessel revealed there to be no solid residue present. Therefore the waste had been broken down to fragments small enough to be carried through the conical mesh as solid chips.

The invention claimed is:

1. A method of cleaning a filter component comprising:
   placing the filter component into a vessel;
   closing the vessel;
   creating in the vessel an atmosphere of superheated steam at a pressure of at least 0.5 bar; and
   subsequent to said creating, flash decompressing the vessel to achieve a pressure reduction within the vessel of at least 0.5 bar in at most 5 seconds.

2. A method as claimed in claim 1 including creating within the vessel an atmosphere of superheated steam at a pressure of a at least 1 bar, and the pressure reduction is of at least 1 bar.

3. A method as claimed in claim 2 including creating within the vessel an atmosphere of superheated steam at a pressure of at least 2 bar, and the pressure reduction is of at least 2 bar.

4. A method as claimed in claim 1 wherein the pressure reduction is achieved in at most 4 seconds.

5. A method as claimed in claim 4 wherein the pressure reduction is achieved in at most 3 seconds.

6. A method as claimed in claim 5 wherein the pressure reduction is achieved in at most 2 seconds.

7. A method as claimed in claim 6 wherein the pressure reduction is achieved in at most 1 second.

8. A method as claimed in claim 1 including creating in the vessel an atmosphere of 2 to 15 bar of superheated steam.

9. A method as claimed in claim 1 comprising at least two cycles of closing the vessel, creating an atmosphere of superheated steam at a pressure of at least 0.5 bar in the vessel and subsequently flash decompressing the vessel to achieve the pressure reduction of at least 0.5 bar in at most 5 seconds.

10. A method as claimed in claim 9 wherein the superheated steam is allowed to flow through the vessel between said cycles.

11. A method as claimed in claim 10 wherein the superheated steam flows through the filter component between said cycles.

12. A method as claimed in claim 1 comprising at least one set of repeated cycles of closing the vessel, creating an the atmosphere of superheated steam at a pressure of 0.5 bar in the vessel and subsequently decompressing the vessel to achieve the pressure reduction of at least 0.5 bar in at most 5 seconds.

13. A method as claimed in claim 12 wherein the cycles of a set are effected substantially immediately one after the other.

14. A method as claimed in claim 12 comprising at least two of said sets of cycles between which superheated steam is allowed to flow through the vessel.

15. A method as claimed in claim 14 wherein superheated steam flows through the filter component between said cycles.

16. A method as claimed in claim 1 wherein the filter component is contaminated with polymer residues.

17. A method as claimed in claim 16 wherein the superheated steam is initially applied to one side of the filter component to effect a degree of polymer melting and subsequently effected to the other side of the component to achieve the required pressure in the vessel.

18. A method as claimed in claim 16 wherein the polymer is a condensation polymer.

19. A method as claimed in claim 18 wherein the polymer is a polyester, polyamide, polycarbonate or cellulose acetate.

20. A method as claimed in claim 19 wherein the polymer is polyethylene terephthalate.

21. A method as claimed in claim 16 wherein the polymer is an olefin polymer or co-polymer.

22. A method as claimed in claim 21 wherein the polymer is polyethylene, polypropylene or PTFE.

23. A method as claimed in claim 16 wherein the polymer is a polyurethane, PVA, PVC, polystyrene, PEEK, rubber or silicone.

24. A method as claimed in claim 1 wherein the filter component is a filter element.

25. A method as claimed in claim 24 wherein the superheated steam is caused to flow through the filter element.

26. A method as claimed in claim 25 wherein the flow of superheated steam through the filter element is in the opposite direction to the direction of fluid flow during filtration.

27. A method as claimed in claim 21 wherein the filter component is a candle filter, disk filter or spinnerette.

28. A method as claimed in claim 1 wherein the filter component is a housing, feed pipe, head stock, pumps, extruder screws, valves, dies, spinnerettes etc.

29. A method of cleaning a filter component comprising the steps of:
   (a) subjecting the filter component to an atmosphere of superheated steam at a pressure of at least 2 to 15 bar in a closed vessel;
   (b) decompressing the vessel to achieve a pressure reduction of at least 0.5 bar;
   (c) following step (b), effecting at least one additional cycle of steps (a) and (b); and
   (d) removing the component from the vessel.

30. The method as claimed in claim 29 wherein the pressure reduction in step (b) is at least 1 bar.

31. The method as claimed in claim 29 wherein said pressure reduction in step (b) is effected in at the most 2 seconds.

\* \* \* \* \*